United States Patent
Ishikawa et al.

(10) Patent No.: US 6,219,110 B1
(45) Date of Patent: Apr. 17, 2001

(54) SINGLE-PANEL COLOR PROJECTOR

(75) Inventors: Yoshimoto Ishikawa, Yamato; Mitsuo Harahata, Kamakura; Akinori Kaneko, Fujisawa, all of (JP)

(73) Assignees: IBM Japan, Ltd., Tokyo (JP); Advanced Peripherals Technologies Inc., Kanagawa-Ken (JP)

(*) Notice: Subject to any disclaimer, the term of this patent is extended or adjusted under 35 U.S.C. 154(b) by 0 days.

(21) Appl. No.: 09/431,911

(22) Filed: Nov. 2, 1999

(30) Foreign Application Priority Data

Nov. 4, 1998 (JP) .................................................. 10-313125

(51) Int. Cl.⁷ ................................ H04N 5/74; H04N 9/31
(52) U.S. Cl. .......................... 348/759; 348/760; 348/771
(58) Field of Search .................................... 348/759, 760, 348/761, 771, 766, 750, 751; 359/634; 349/5, 8, 9, 95; 353/32, 33, 34; H04N 5/74, 9/31

(56) References Cited

U.S. PATENT DOCUMENTS

| | | | |
|---|---|---|---|
| 5,150,205 | * 9/1992 | Um et al. .............................. | 359/618 |
| 5,528,318 | 6/1996 | Janssen ................................. | 348/756 |
| 5,548,349 | * 8/1996 | Mizuguchi et al. ................. | 348/766 |
| 5,777,804 | * 7/1998 | Nakamura et al. .................. | 359/727 |
| 5,969,832 | * 10/1999 | Nakanishi et al. .................. | 349/95 |
| 6,020,940 | * 2/2000 | Ishikawa et al. ..................... | 349/8 |
| 6,050,689 | * 4/2000 | Nakamura et al. .................. | 353/31 |
| 6,057,894 | * 5/2000 | Kobayashi ............................ | 349/5 |

FOREIGN PATENT DOCUMENTS

| | | | |
|---|---|---|---|
| 59-230383 | 12/1984 | (JP) ................................. | H04N/9/31 |
| 460538 | 2/1992 | (JP) ................................ | G03B/33/12 |

* cited by examiner

*Primary Examiner*—Michael Lee
(74) *Attorney, Agent, or Firm*—Volpe and Koening, P.C.

(57) ABSTRACT

Light emitted from a white light source is separated into red, green and blue light beams by dichroic mirrors. The resulting light beams are directed onto a lenticular lens system having large-pitch lenticular lenses and small-pitch lenticular lenses formed on opposed surfaces. This lens system converts the red, green and blue light beams incident on each of the large-pitch lenticular lenses into a color band set consisting of a set of separated subbands of the red, green and blue light beams the diameter of which is narrowed down to one-third or less of that of the incident light beam through the small-pitch lenticular lenses. The resulting color band sets emerging from the small-pitch lenticular lenses are focused onto a DMD panel through a mirror galvanometer and a coupling lens. The mirror galvanometer is rotated in such a way as to move the color band sets over the DMD panel up and down by the amount corresponding to the pitch of the color band sets while the DMD panel is being driven. Modulated light from the DMD panel is projected onto a screen through a projection lens.

17 Claims, 7 Drawing Sheets

SINGLE-PANEL COLOR PROJECTOR

BACKGROUND OF THE INVENTION

The present invention relates to a single-panel color projector which uses only a single light valve for light modulation.

The current mainstream of color projector is in three-panel projectors that use three light valves such as liquid crystal panels. This is because they are easy to install, have good portability, and provide high brightness. However, the light valve is costly. Thus, the overall cost of apparatus that uses three light valves is increased.

There is also known a single-panel color projector that uses only one light valve such as a liquid crystal panel. This type of color projector is lower in cost than those using three light valves. A conventional single-plate color projector, for example, one which uses a mosaic color filter for the light valve as disclosed in Japanese Unexamined Patent Publication No. 59-230383 has a problem that image brightness is lowered because about two-third of illumination light is absorbed or reflected by that color filter. Moreover, the resolution required with the single light valve is three times as high as that of the light valves in the three-plate color projector. Thus, the cost of the light valve will become very high and a considerable reduction in overall cost cannot therefore be expected.

A color projector as disclosed in Japanese Unexamined Patent Publication No. 4-60538 is arranged to separate three primary colors of light in angular directions by means of three dichroic mirrors and cause the three primary colors of light to focus onto their respective target areas by microlenses, thereby performing the function of a color filter. This significantly improves utilization of illumination light. However, in this type of color projector as well, as with the color projector using color filter, the resolution is required to be three times as high as the resolution of each of three light valves in the three-panel color projector and hence a considerable reduction in overall cost cannot be expected.

As another single-panel type of color projector, a color sequential display type of color projector is also known which uses a rotating color filer disc. In this color projector, one pixel is irradiated sequentially with red, green and blue colors of light to provide full color display. In this system, the resolution required with the light valve remains unchanged from that in the three-plate color projector. However, this system requires a light valve with a short response time. Therefore, liquid crystal panels as used in normal color projectors cannot be used because they have too long a response time. For this reason, light valves, such as DMDs (Digital Micromirror Devices) or ferroelectric liquid crystal panels, that have a short response time will be used. However, such light valves are bistable devices which are switched between on and off states. For example, the representation of gray scales by the valve is realized by the use of PWM (Pulse Width Modulation), i.e., by varying its on time. In this system, about two-third of illumination light is lost because of absorption or reflection by the color filter disk, which will result in a problem of low image brightness.

As a high-speed light valve, a reflective liquid crystal panel oriented toward micro-display (head-mounted display) has been developed which sequentially turns on red, green and blue LEDs to provide color sequential display. In application of this liquid crystal panel in a liquid crystal projector, red, green and blue light will be taken out of white light from a white light source by the use of a rotating color filter disk, as used in a single-panel color projector using DMD, and then projected sequentially onto the liquid crystal panel. This system needs a rapid-response liquid crystal light valve.

The responsiveness of the liquid crystal light valve depends on the response characteristic of a liquid crystal material and the response characteristic of switching devices. As rapid-response liquid crystal materials, ferroelectric liquid crystal materials and anti-ferroelectric liquid crystal materials have been developed. These materials perform a digital-like operation of blocking light or letting it pass and the representation of gray scales is carried out by controlling the length of time that light passes through. Therefore, these materials must be used in combination with very fast switching devices. Amorphous silicon as the material of switching devices widely used in transmissive liquid crystal light valves is low in electron mobility and is not therefore suitable for fast switching. On the other hand, crystalline silicon used in reflective liquid crystal valves is high in electron mobility and hence allows fast switching required with the color sequential system. This system allows full color display with one pixel of liquid crystal and can solve the problem of the conventional single-panel system that there is the need for a light valve whose resolution is at least three times higher than with the three-panel system in which three light valves are used. However, it is impossible to solve the other problem that only one-third of light from a light source is utilized because of the use of the rotating color filter disk and bright image display cannot therefore be provided.

Moreover, a color-sequential projector is also known which employs a rotating prism. For example, in U.S. Pat. No. 5,528,318 there is disclosed a system which decomposes white light from a white light source into red, green and blue color band sets and scans or moves these color band sets over a light valve using the rotating prism. This system allows the panel resolution to be the same as with the three-plate system. In addition, this system has the advantage of being high in image brightness. However, this system has the following problems: (1) Color nonuniformity occurs because the color band scanning speed is not constant with respect to the rotation of the prism, and (2), since the color band sets are narrow in width, the length of time that a band moves across a certain line of pixels is very short and hence the existing DMDs and ferroelectric liquid crystal panels cannot represent required gray scales within that length of time with the use of PWM control.

As described above, the conventional single-panel color projector cannot increase image brightness using an existing light valve and cannot realize the representation of sufficient gray scales at low cost.

It is therefore an object of the present invention to provide a single-panel color projector which permits image brightness to be increased, cost to be reduced and sufficient gray scales to be represented through the use of an existing light valve.

BRIEF SUMMARY OF THE INVENTION

According to an aspect of the present invention, there is provided a single-panel color projector comprising: a white light source; color separating/ reflecting means for separating white light emitted from the white light source into a plurality of color light beams and reflecting each of the light beams at a different angle; conversion means for converting the color light beams reflected by the color separating/ reflecting means into color band sets arranged in a predetermined pitch, each color band consisting of a set of subbands of the color light beams arranged in a predetermined sequence; focusing means for focusing the color band sets from the conversion means onto a light valve for light modulation; scanning means for moving the color band sets from the conversion means over the light valve by the amount corresponding to the pitch of the color band sets; and projection means for projecting light modulated in the light valve.

According to the present invention, image brightness can be increased and cost can be reduced using an existing light valve. In addition, sufficient gray scales can be represented.

Further, a loss attendant the reversal of direction in which the color band sets are moved over the light valve can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The preferred embodiments of the present invention will be described with reference to the accompanying drawings.

First Embodiment

First, the outline of a first embodiment of the present invention will be given. White light emitted from a white light source, such as a metal halide lamp, is separated into red, green and blue light beams which are not parallel with one another by three non-parallel dichroic mirrors. These light beams are then converted by a lenticular lens system into a plurality of color band sets each consisting of a set of three red, green and blue-light subbands. The width of each color subband is set a little smaller than one third of the pitch of the color band sets. The image of all the color band sets is formed by a coupling lens onto a DMD panel that is a high-speed light valve. The image is formed to overfill the effective area of the DMD panel by the width of one color band set.

All the color band sets are moved by a scanning optical system consisting of a galvanometer over the DMD panel at equal velocity by the amount corresponding to the width of one color band set (the pitch of the color band sets). At the completion of the movement of the color band sets by the amount corresponding to their pitch, the galvanometer reverses rapidly to make a backward scan. In this manner, forward and backward scans are repeated.

When each color subband scans a certain line of pixels on the DMD panel, the on/off time of each of the pixels is controlled appropriately by an electronic circuit in the projector in accordance with the cross-sectional shape of color and brightness of that subband and a color component for that pixel in an image to be displayed.

Thus, the width of each color subband can be set to about one-third of the scanning width and the length of time that each color subband scans a pixel can be made sufficiently long, which allows the DMD panel to represent sufficient gray levels with PWM control. Light modulated by the DMD panel is projected onto a screen through a projection lens.

Thus, using a single DMD panel, most of the red, green and blue light can be employed simultaneously, image brightness can be increased, and cost can be reduced. Moreover, the use of a single panel eliminates the necessity of correction for misalignment among three-color pixels as occurs in the three-plate color projector. Furthermore, there is no need for a dichroic mirror or dichroic prism for color composition, thus allowing a further reduction in cost.

Specific examples will be described hereinafter.

Figure 1:
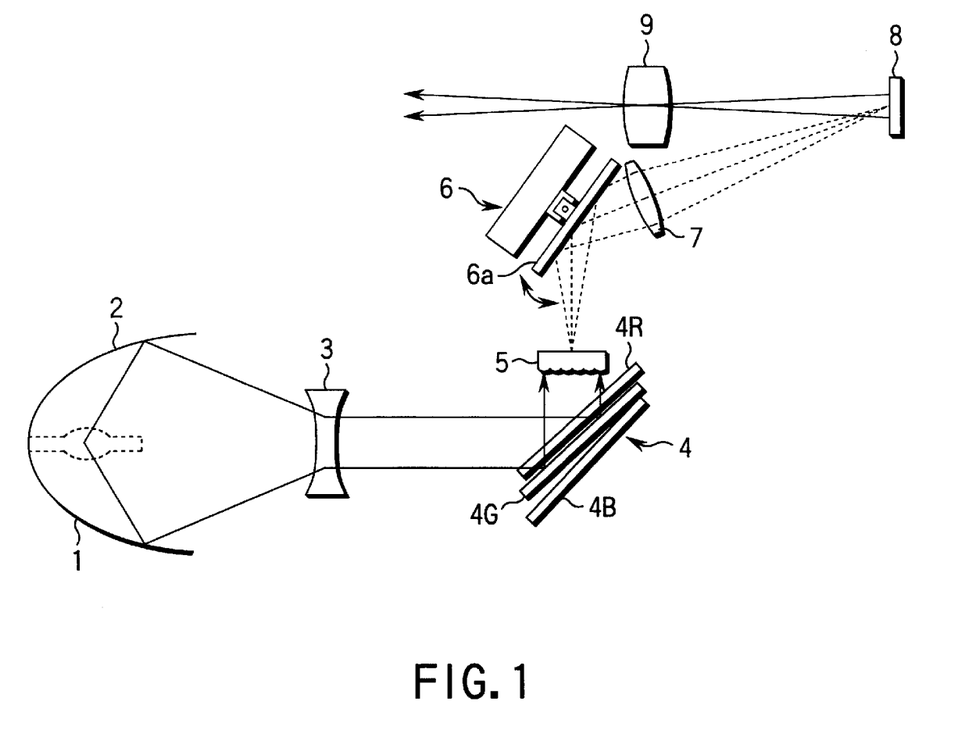
FIG. 1 is a schematic diagram of a first embodiment of the present invention.

Referring now to FIG. 1, 1 denotes a white source such as a metal halide lamp. The white light source 1 is placed in the position of a first focal point of an elliptic reflecting mirror 2. A concave lens 3 is placed short of a second focal point of the reflecting mirror 2 so that its focal point conforms to that second focus, i.e., on the side of the white light source.

Thus, white light emitted from the white light source 1 is reflected by the elliptic reflecting mirror 2 and then passes through the concave lens 3, so that it has its diameter narrowed down and is converted into a substantially parallel beam of light. Note that a convex lens can be used instead of the concave lens 3, in which case the convex lens is placed behind the second focal point of the elliptic reflecting mirror 2 so that its focal point conforms to the second focal point.

Behind the concave lens 2 is placed a dichroic mirror system 4 serving as color separating and reflecting means and consisting of three dichroic mirrors 4R, 4G and 4B. Each of the dichroic mirrors 4R, 4G and 4B is placed tilted with respect to the incident light beam. The dichroic mirror 4R situated in the front selectively reflects light within the red waveband. The central dichroic mirror 4G selectively reflects light within the green waveband. The rearmost dichroic mirror 4B selectively reflects light within the blue waveband.

The light reflected by the dichroic mirror or mirrors situated near to the white light source 1 will not reach the dichroic mirror or mirrors situated farther away from the white light source. Thus, each dichroic mirror need not necessarily be formed to reflect light reflected by the dichroic mirror or mirrors situated in front of it. That is, the dichroic mirror 4G may or may not reflect the red waveband component. Likewise, the dichroic mirror 4B may or may not reflect the red and green waveband components.

The light valve can be prevented from heating by causing each of the dichroic mirrors 4R, 4G and 4B to have the property of transmitting infrared radiation.

The dichroic mirror 4G is placed at an angle of 45 degrees with respect to the direction of incident light beam. The dichroic mirror 4R is oriented at an angle of, for example, +4 degrees with respect to the dichroic mirror 4G. The dichroic mirror 4B is oriented at an angle of −4 degrees with respect to the dichroic mirror 4G. Thereby, the green light beam is bent 90 degrees by reflection by the dichroic mirror 4G. The red and blue light beams reflected by the dichroic mirrors 4R and 4B are oriented at angles of −8 and +8 degrees, respectively, with respect to the green light beam.

Figure 2:
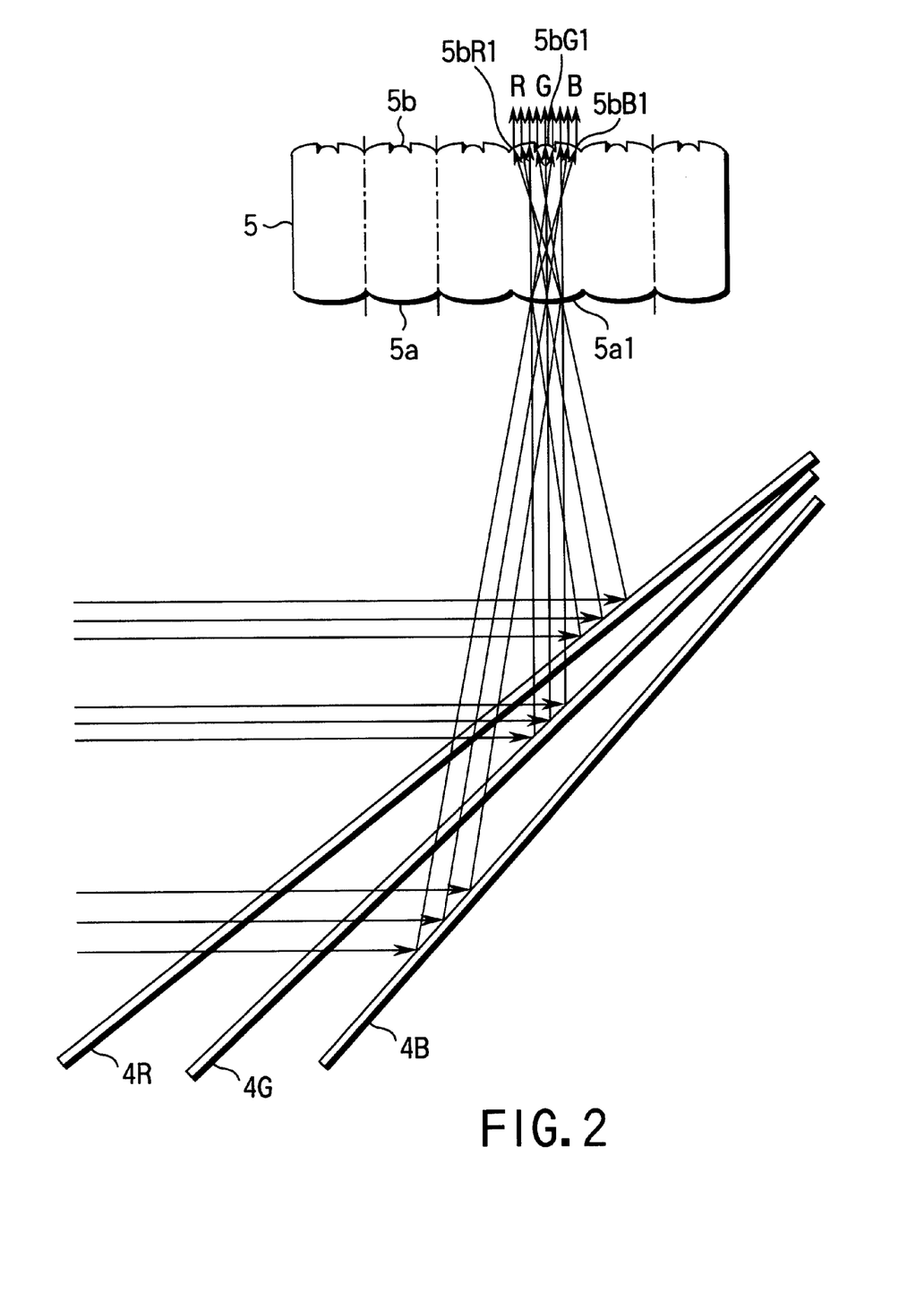
FIG. 2 is an partially enlarged view for use in explanation of the configuration and action of the lenticular lens system in the first embodiment.

The red, green and blue light beams emerging from the dichroic mirror system 4 are directed to a lenticular lens system 5 as conversion means. The lenticular lens system consists, as shown in FIG. 2, of a combination of lenticular lenses 5a arranged in a large pitch and lenticular lenses 5b arranged in a small pitch. For example, the large-pitch lenticular lenses 5a and the small-pitch lenticular lenses 5b are formed on opposite sides of a sheet of glass by press working. This lens system is formed such that three small-pitch lenses are opposed to one of large-pitch lenticular lenses 5a.

The green light beam directed vertically to a certain lenticular lens 5a1 of the large-pitch lenticular lenses 5a converges at the focal point of that lens 5a1 and is then converted into a light beam of diameter of ⅓ or less by a small lenticular lens 5bG1 whose focal point is common to the large-pitch lens 5a1 and whose focal length is ⅓ or less of that of the lens 5a1.

The red light beam incident on the lens 5a1 at an angle of −8 degrees converges on a point located at some distance from the focal point of that lens and is then converted into a light beam of diameter of ⅓ or less by the lens 5bR1 whose focal point is that point on which the red light beam converges.

The blue light beam incident on the lens 5a1 at an angle of +8 degrees converges on a point that is located at some distance from the focal point of that lens and opposed to the red-light convergence point with the focal point of the lens 5a1 therebetween. It is then converted into a light beam of diameter of ⅓ or less by the lens 5bB1 whose focal point is that point on which the blue light beam converges.

In this manner, the lenticular lens system 5 produces color band sets each consisting of a set of three separate red, green and blue subbands. The number of the color band sets thus produced is equal to the number of effective large-pitch lenticular lenses on which incoming light falls.

The outgoing color band sets from the lenticular lens system 5 are directed onto the reflecting surface of a mirror galvanometer associated with an encoder 6. The mirror galvanometer and the encoder constructs scanning means that deflects the color band sets by the amount corresponding to their pitch. The reflected light from the mirror 6a are focused onto the a DMD (Digital Micromirror Device) panel 8 as a light valve by a coupling lens 7 constituting image formation means. The mirror galvanometer 6a is rotatable upon its axis of rotation, i.e., in the directions indicated by arrows.

In the initial state of the mirror galvanometer 6a, the image of the color band sets projected onto the DMD panel 8 is set to cover the width of the effective area of the DMD panel in the horizontal direction (in FIG. 1, the direction normal to the drawing paper) and, in the vertical direction, overflow the DMD panel effective area down by the amount corresponding to the pitch of the color band sets.

Figure 3:
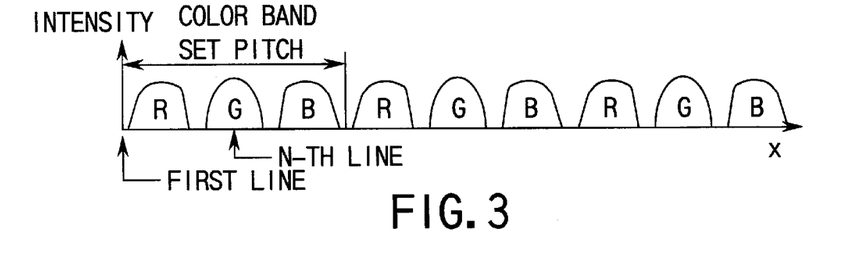
FIG. 3 shows a pattern of color band sets in the first embodiment.

The topmost line of pixels on the DMD panel 8 is numbered 0. In the initial state of the mirror galvanometer 6a, the color band sets directed to the DMD panel over a distance of X mm from the topmost line form a repeating pattern of f(x) of three red, green and blue subbands as shown in FIG. 3.

In FIG. 1, when the mirror galvanometer 6a is rotated counterclockwise at a constant angular velocity, all the color band sets on the DMD panel 8 move vertically up at a constant velocity V. Although, in practice, a certain period of time is needed before the constant velocity V is reached, the point of time at which the uniform motion is started is taken to be the initial state, i.e., t=0.

Figure 4:
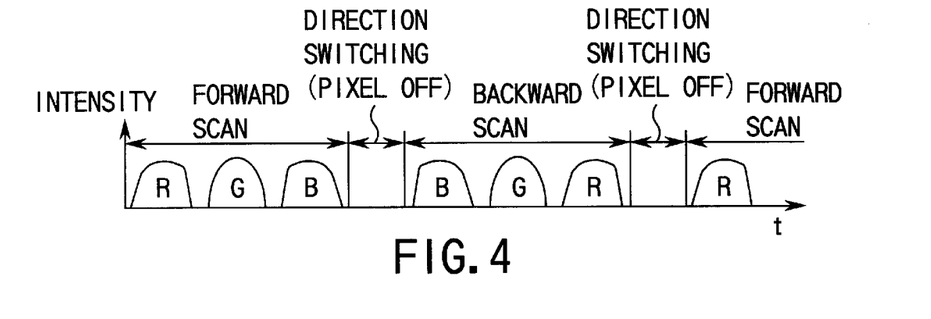
FIG. 4 shows irradiation patterns of color band sets with which the first line of the DMD panel is irradiated in the first embodiment.
Figure 5:
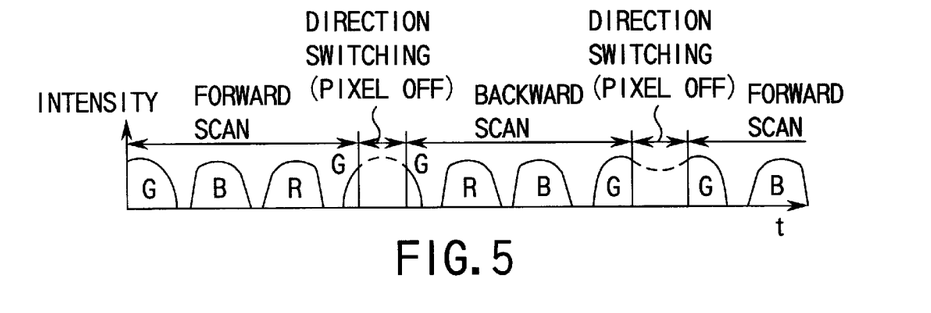
FIG. 5 shows irradiation patterns of color band sets with which the N-th line of the DMD panel is irradiated in the first embodiment.

The topmost line on the DMD panel 8 is successively exposed to red, green and blue light beams in the pattern of f(0+V×t) as shown in FIG. 4. The N-th line counting from the topmost line is successively exposed, as shown in FIG. 5, to red, green and blue light beams in the pattern of f(N×p+V×t), i.e., in the pattern which differs only in phase from f(0+V×t). Here, t is the movement time of color band sets.

Therefore, while all the color band sets are moved by the distance corresponding to their pitch, all the pixels on the DMD panel 8 will be irradiated with light in the same pattern but in different phases depending on their respective location. When the color band sets are moved by their pitch, the mirror galvanometer 6a switches rapidly its direction of rotation to start a uniform motion in the reverse direction. The mirror galvanometer 6a reciprocates repeatedly in this way. The DMD panel 8 is switched off during the interval when the direction of rotation of the mirror is being reversed.

If the overall width of the color band sets in the vertical direction is made M (>1) times larger than the pitch of the color band sets and the color band scanning width in the vertical direction is made (M−1) times larger, then the mirror galvanometer 6a will not be required to switch its direction of rotation until the color band sets are moved vertically up or down by (M−1) times the pitch. Thus, the number of times the mirror switches its direction of rotation is reduced, allowing brighter images to be obtained. In this case, however, since the area which is exposed to the color band sets increases, the amount of light that is effectively directed onto the DMD panel 8 will be somewhat reduced.

The color and intensity (brightness) of light to which a certain pixel is exposed can be known by reading a pattern f(x) of colors and brightness in each color band with sensors, for example, at the time of assembly of the color projector, storing resulting data in the form of a table into a nonvolatile memory, detecting the amount of movement of the color band sets with the encoder, and referencing the data in the nonvolatile memory.

A full color image can be produced on the DMD panel 8 and then projected onto a screen through the projection lens 9 by controlling the timing of turning on the corresponding pixel on the DMD panel while the color band sets are being moved so that gray scale levels of three primary-color components for the pixel are obtained.

Figure 6:
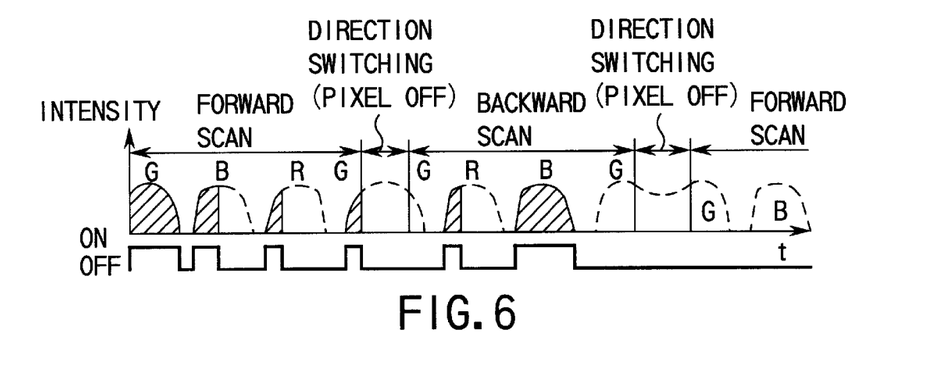
FIG. 6 shows driving patterns for a certain pixel on the N-th line of the DMD panel in the first embodiment.

For example, by controlling the timing of turning on and off a certain pixel on the N-th line as shown in FIG. 6, in the first forward scan the pixel is displayed in 100% of green G, 50% of blue B, and 25% of red R and in the next backward scan it is displayed in 0% of green G, 100% of blue B, and 50% of red R.

Thus, using a single DMD panel, most of the red, green and blue light can be employed simultaneously, image brightness can be increased, and cost can be reduced. Moreover, the width of each color subband in each color band set can be set to about one-third of the scanning width and hence the length of time that each color subband scans a pixel can be made sufficiently long, which allows the DMD panel to represent sufficient shades with PWM control.

Furthermore, the use of a single panel eliminates the necessity of correction for misalignment among three-color pixels as occurs in the three-plate color projector. In addition, there is no need for a dichroic mirror or dichroic prism for color composition, thus allowing a further reduction in cost.

Second Embodiment

In the second embodiment, like reference numerals are used to denote corresponding components to those in the aforementioned first embodiment and detailed description thereof is omitted.

Figure 7:
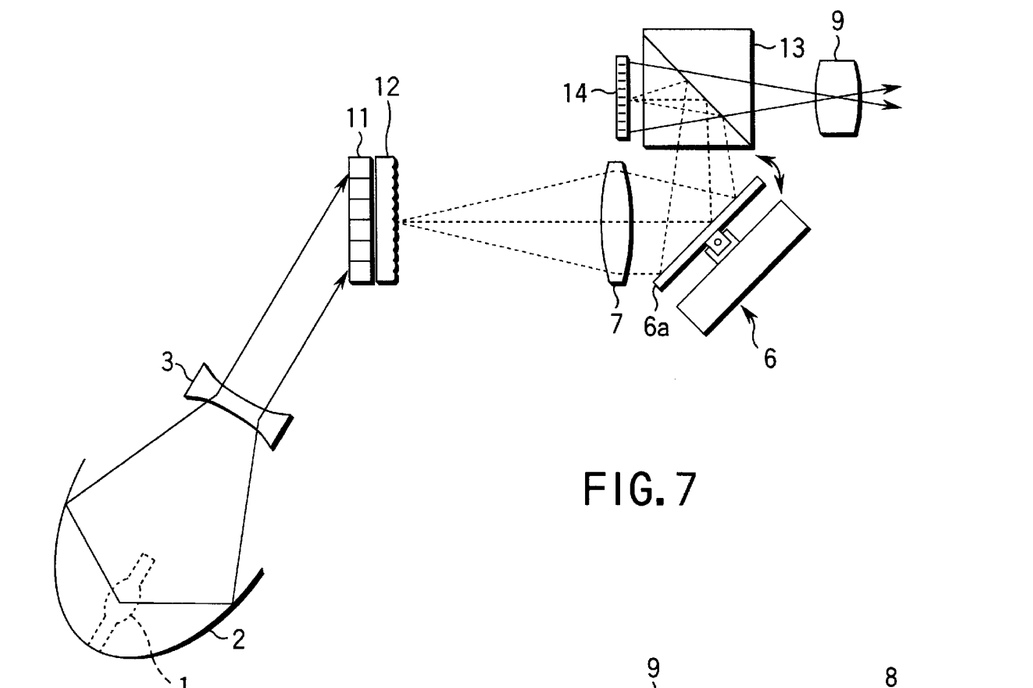
FIG. 7 is a schematic diagram of a second embodiment of the present invention.

Although, in the first embodiment described above, the dichroic mirror system is used as the decomposing/reflecting means for decomposing white light into red, green and blue light beams, in the second embodiment a phase volume diffraction grating 11 is used which consists of a phase volume hologram having a lens function. This grating has a function of separating incoming light into red, green and blue light beams that are tilted slightly with respect to one another. In addition, the grating has the function of large-pitch lenticular lenses.

Therefore, a lenticular lens system 12 for producing color band sets each consisting of a set of red, green and blue subbands from incoming white light is only required to have small-pitch lenticular lenses.

As shown in FIG. 7, white light from the concave lens 3 is directed onto the phase volume grating 11 consisting of a phase volume hologram and then separated into red, green and blue light beams at some angles with one another. The red, green and blue light beams then fall on the lenticular lens system 12.

The lenticular lens system 12 produces a plurality of color band sets each consisting of a set of red, green and blue subbands. The width of each subband is set to about one-third of the scanning width.

The image of the color band sets emerging from the small-pitch lenticular lenses of the lenticular lens system 12 is reflected by the mirror galvanometer 6a through the coupling lens 7 and then focused through a polarizing beam splitter 13 onto a light valve 14 consisting of a reflective liquid crystal panel.

The color image emerging from the light valve 14 is projected by the projection lens 9 through the polarizing beam splitter 13 onto a screen.

In this arrangement, as in the aforementioned arrangement, image brightness can be increased and cost can be reduced. In addition, sufficient shades can be represented.

In the aforementioned embodiments, a mirror galvanometer is used as the scanning means that moves the color band sets by the distance corresponding to their pitch; however, this is not restrictive. For example, use may be made of a variable-apex-angle prism whose apex angle can be adjusted electrically or a mechanism that allows control of the movement of the coupling lens.

Third Embodiment

In the third embodiment, like reference numerals are used to denote corresponding components to those in the aforementioned embodiments and detailed description thereof is omitted.

Figure 8:
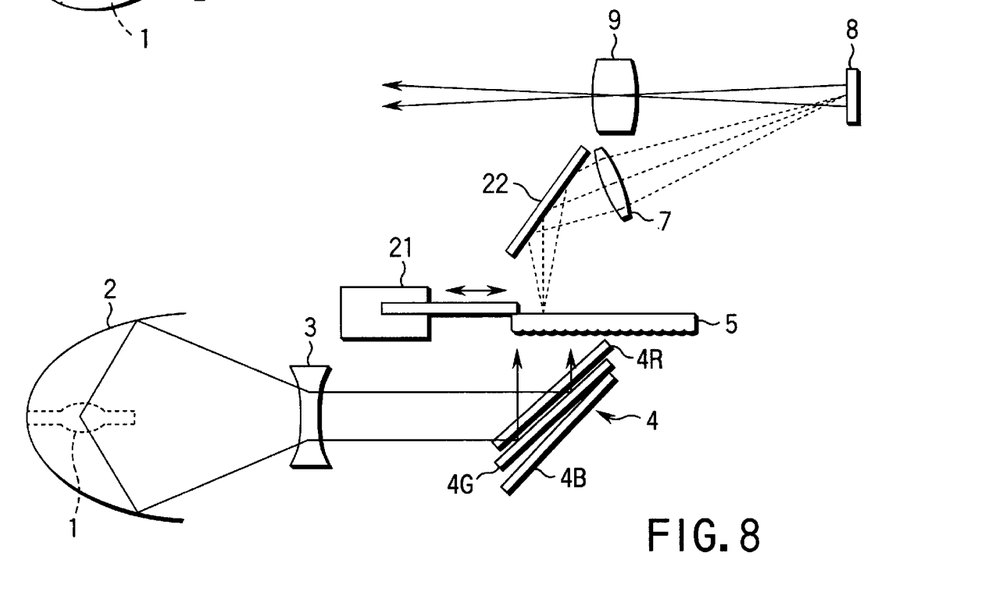
FIG. 8 is a schematic diagram of a third embodiment of the present invention.

In this embodiment, as shown in FIG. 8, a plate-like lenticular lens system 5 is used as the conversion means and a linear motor/encoder 21 that moves the lenticular lens system forward and backward as indicated by arrows is used as the scanning means.

The lenticular lens system 5 produces a plurality of color band sets each consisting of a set of red, green and blue subbands from incoming white light. The width of each subband is set to about one-third of the scanning width.

The image of the color band sets emerging from the small-pitch lenticular lenses of the lenticular lens system 5 is reflected by a reflecting mirror 22 and then focused by the coupling lens 7 onto the DMD panel 8 as a light valve.

The length of the lenticular lens system 5 is set so that the image of the color band sets projected onto the DMD panel 8 in the initial state of the linear motor/encoder 21 covers the width of the effective area of the DMD panel in the horizontal direction (in FIG. 8, the direction normal to the drawing paper) and, in the vertical direction, overflow the DMD panel effective area down by the amount corresponding to an integral multiple of the pitch of the color band sets.

Figure 9:
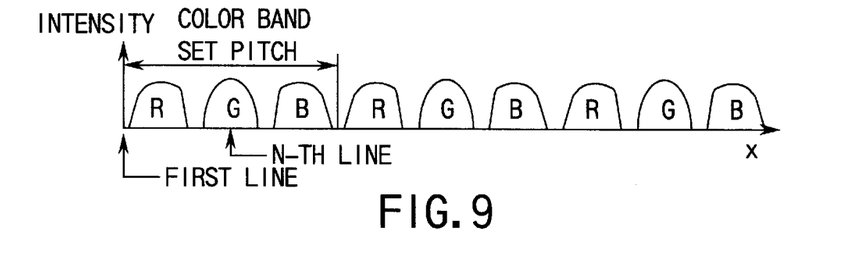
FIG. 9 shows a pattern of color band sets in the third embodiment.

The topmost line of pixels on the DMD panel 8 is numbered 0. In the initial state of the linear motor/encoder 21, the color band sets directed onto the DMD panel over a distance of X mm from the topmost line form a repeating pattern of f(x) of three red, green and blue subbands as shown in FIG. 9.

When the lenticular lens system 5 is moved forward at a constant velocity by the linear motor/encoder 21, all the color band sets on the DMD panel 8 move vertically up at a constant velocity V. Although, in practice, a certain period of time is needed before the constant velocity V is reached, the point of time at which the uniform motion is started is taken to be the initial state, i.e., t=0.

Figure 10:
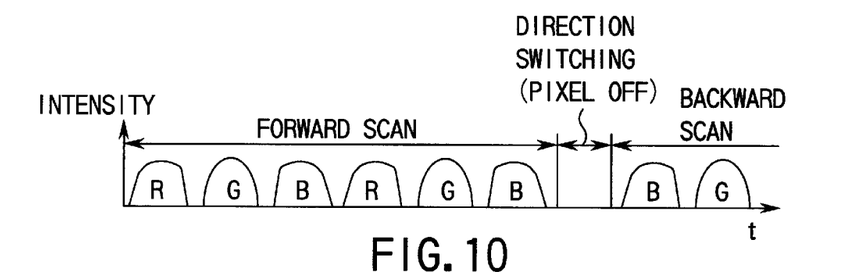
FIG. 10 shows irradiation patterns of color band sets with which the first line of the DMD panel is irradiated in the third embodiment.

The topmost line of pixels on the DMD panel 8 is successively exposed to red, green and blue light beams in the pattern of f(0+V×t) as shown in FIG. 10. When the color band sets are moved by the distance corresponding to their pitch, the incident light on the DMD panel 8 becomes equal to that in the initial state.

Since the length of the lenticular lens system 5 is set larger than the width of incident light by the amount corresponding to an integral multiple of the pitch of the color band sets, the scanning of the color band sets can be made a plurality of times in succession. FIG. 10 shows a case where the scanning is made twice in succession.

Thus, by increasing the length of the lenticular lens system 5, a forward or backward scan can be made with a plurality of color band sets, allowing the number of times switching between forward and backward scans is made to be reduced.

When the near end of the lenticular lens system 5 reaches the near end of the incident light as the result of forward movement of the lens system, the linear motor/encoder 21 starts pulling back the lenticular lens system at a constant velocity. In this way, the linear motor/encoder 21 repeats reciprocation of the lenticular lens system 5. During the interval when the direction of movement of the lenticular lens system is being reversed, the driving of the DMD panel 8 is interrupted, resulting in a loss.

Figure 11:
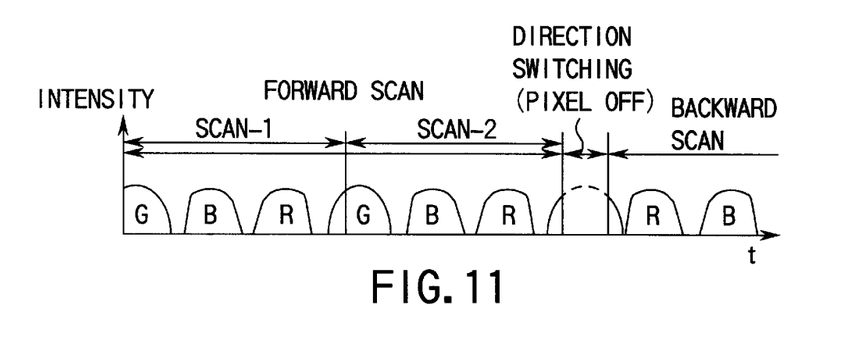
FIG. 11 shows irradiation patterns of color band sets with which the N-th line of the DMD panel is irradiated in the third embodiment.

The N-th line counting from the topmost line is successively exposed, as shown in FIG. 11, to red, green and blue light beams in the pattern of $f(N \times p + V \times t)$, i.e., in the pattern which differs only in phase from $f(0 + V \times t)$.

The color and intensity (brightness) of light to which a certain pixel is exposed can be known by reading a pattern $f(x)$ of colors and brightness in each color band set with sensors, for example, at the time of assembly of the color projector, storing resulting data in the form of a table into a nonvolatile memory, detecting the amount of movement of the color band sets with the encoder, and referencing the data in the nonvolatile memory.

A full color image is produced on the DMD panel 8 and then projected onto a screen through the projection lens 9 by controlling the timing of turning on the corresponding pixel on the DMD panel while the color band sets are being moved so that gray scale levels of three primary-color components for the pixel are obtained.

Figure 12:
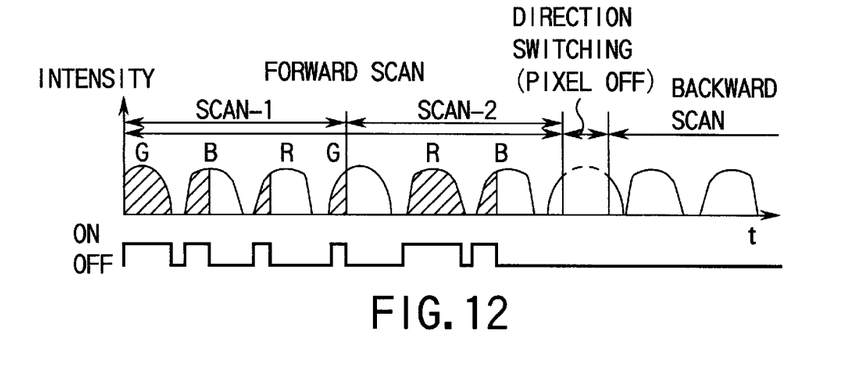
FIG. 12 shows driving patterns for a certain pixel on the N-th line of the DMD panel in the third embodiment.

For example, by controlling the timing of turning on and off a certain pixel on the N-th line as shown in FIG. 12, in the first forward scan the pixel will be displayed in 100% of green G, 50% of blue B, and 25% of red R and in the next backward scan it will be displayed in 0% of green G, 100% of blue B, and 50% of red R.

By switching the scanning direction after a forward scan corresponding to a plurality of color band sets is made and switching again the scanning direction after a backward scan corresponding to the plurality of color band sets, the number of times the direction switching is made is reduced, allowing the loss attendant the direction switching to be reduced.

As in the aforementioned embodiments, in this embodiment, using a single DMD panel, most of the red, green and blue light can be employed simultaneously, image brightness can be increased, and cost can be reduced. Moreover, the width of each color subband in each color band set can be set to about one-third of the scanning width and hence the length of time that each color subband scans a pixel can be made sufficiently long, which allows the DMD panel to represent sufficient shades with PWM control.

Fourth Embodiment

In the fourth embodiment, like reference numerals are used to denote corresponding components to those in the aforementioned embodiments and detailed description thereof is omitted.

Figure 13:
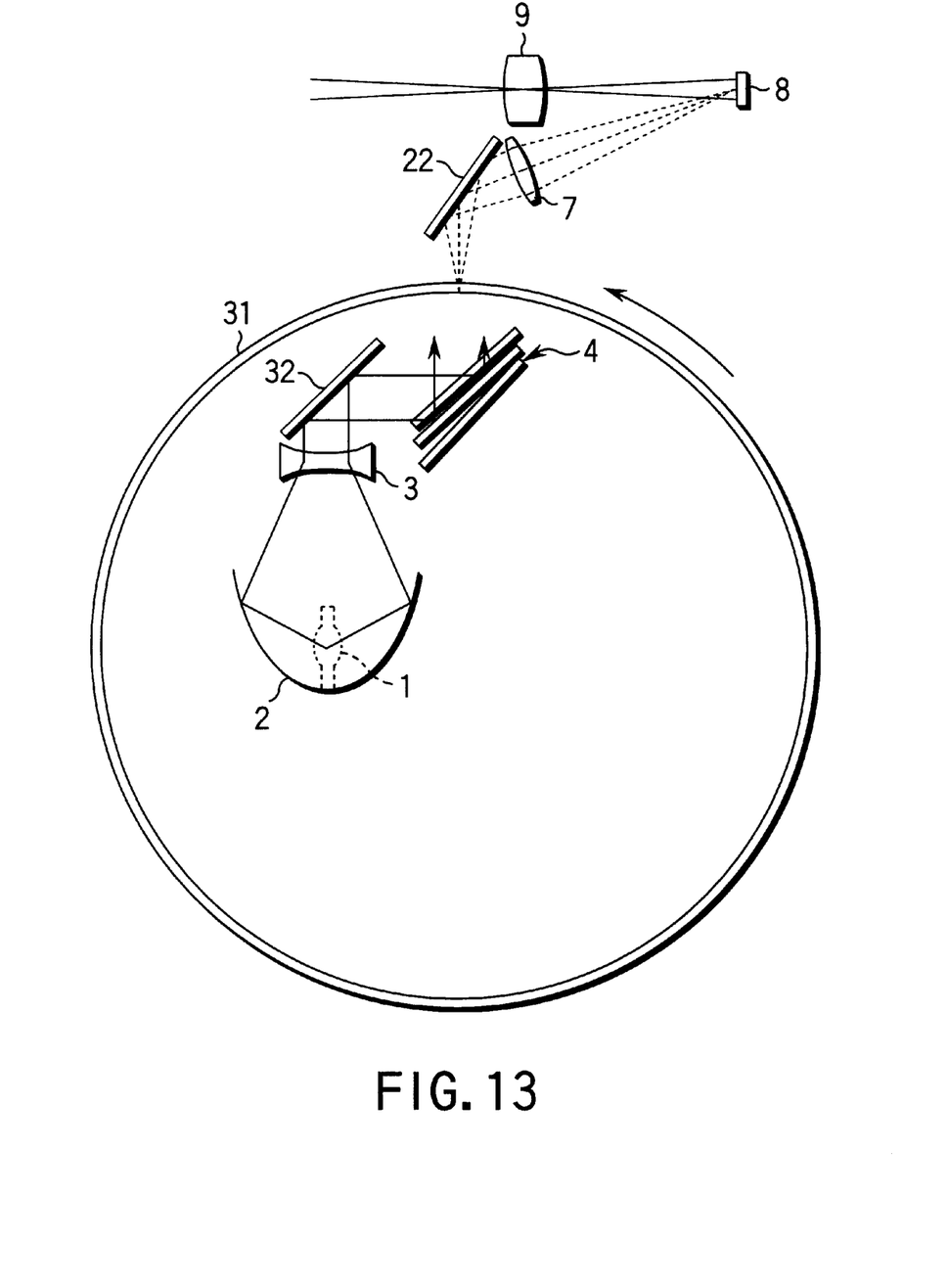
FIG. 13 is a schematic diagram of a fourth embodiment of the present invention.

Although the third embodiment uses the plate-like lenticular lens system as the conversion means and the linear motor/encoder that moves forward and backward the lenticular lens system as the scanning means, the fourth embodiment uses a cylinder-shaped lenticular lens system 31 formed on the surfaces of a cylinder as the conversion means and a driving means, such as a motor, that rotates the lenticular lens system in the direction indicated by an arrow as the scanning means.

Within the cylinder are housed the white light source 1, the elliptic reflecting mirror 3, the concave lens 3, the dichroic mirror system 4, and a reflecting mirror 32 that directs white light from the concave lens 3 to the dichroic mirror system 4. The lenticular lens system 31 has large-pitch lenticular lenses formed on its inside surface and small-pitch lenticular lenses formed on its outside surface.

In this embodiment, red, green and blue light beams separated by the dichroic mirror system 4 is converted by the lenticular lens system 31 into color band sets each consisting of a set of red, green and blue subbands. The color subbands are then moved over the DMD panel 8 like R→G→B→R→G→B→. . . without direction reversal by the lenticular lens system being rotated at a constant speed by the driving means.

The rotating of the lenticular lens system in one direction allows the color band sets to scan over the DMD panel 8 continuously without direction reversal, thus eliminating the loss attendant scanning direction reversal. In this embodiment, as in the aforementioned embodiments, image brightness can be increased and cost can be reduced. In addition, sufficient shades can be displayed.

Fifth Embodiment

In the fifth embodiment, like reference numerals are used to denote corresponding components to those in the aforementioned embodiments and detailed description thereof is omitted.

Figure 14:
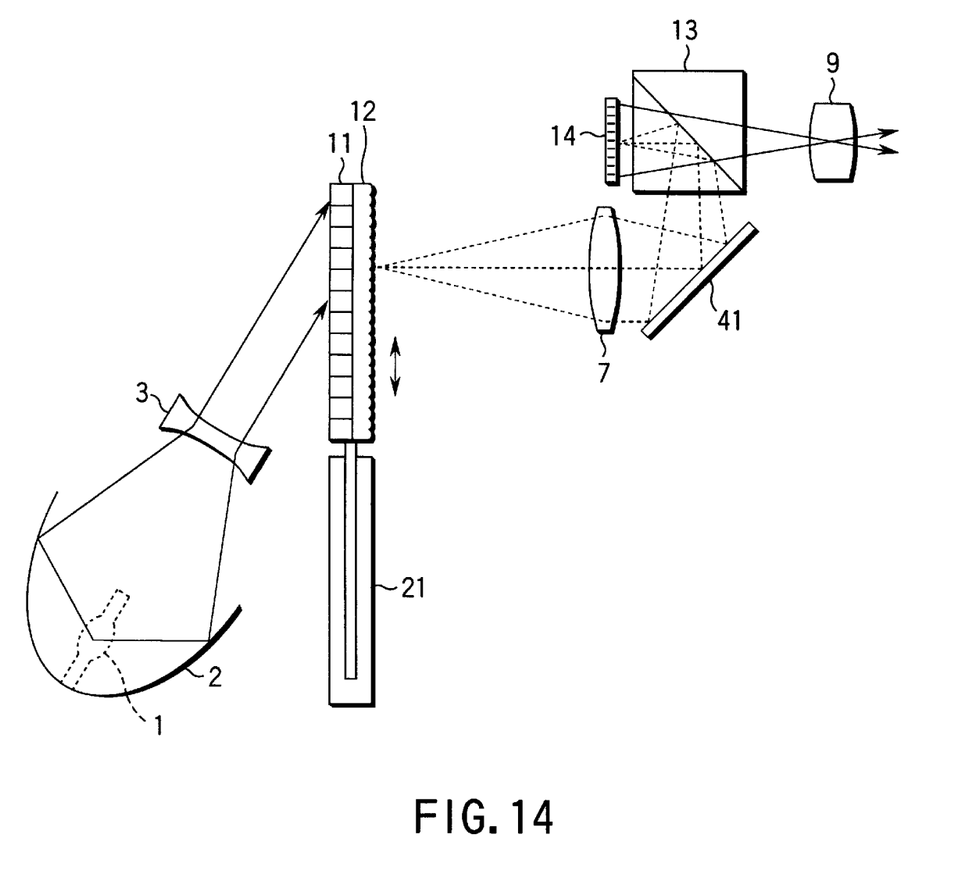
FIG. 14 is a schematic diagram of a fifth embodiment of the present invention.

Although, in the third embodiment described above, the dichroic mirror system is used as the color separating/reflecting means for separating white light into red, green and blue light beams, in the fifth embodiment the phase volume diffraction grating 11 is used which consists of a phase volume hologram having a lens function. This grating has a function of separating incoming light into red, green and blue light beams at some angles with one another. In addition, the grating has the function of large-pitch lenticular lenses.

Therefore, the lenticular lens system 12 for producing color band sets each consisting of a set of red, green and blue subbands from incoming white light is only required to have small-pitch lenticular lenses.

As shown in FIG. 14, white light passed through the concave lens 3 is directed onto the phase volume grating 11 consisting of a phase volume hologram and then separated into red, green and blue light beams at some angles with one another. The red, green and blue light beams then are directed to the lenticular lens system 12.

The lenticular lens system 12 produces a plurality of color band sets each consisting of red, green and blue subbands from the incident red, green and blue light. The width of each subband is set to about one-third of the scanning width. The phase volume grating 11 and the lenticular lens system 12, which are of integral construction, are moved forward and backward as indicated by arrows by the linear motor/encoder 21. The phase volume grating 11 and the lenticular lens system 5 have their length set larger than the width of incident light by the amount corresponding to an integral multiple of the pitch of the color band sets. Thus, the scanning of the color band sets can be made a plurality of times in succession.

The image of the color band sets emerging from the small-pitch lenticular lenses of the lenticular lens system 12 is reflected by the coupling lens 7, then reflected by the reflecting mirror 41 and formed through the polarizing beam splitter 13 onto the light valve 14 consisting of a reflective liquid crystal panel.

The full color image emerging from the light valve 14 is projected by the projection lens 9 through the polarizing beam splitter 13 onto a screen.

In this arrangement as well, the number of times of the direction switching is reduced by switching the scanning direction after a forward scan corresponding to an integral multiple of the pitch of the color band sets is made and switching again the scanning direction after a backward scan corresponding to the integral multiple of the pitch of the color band sets. Thus, the loss attendant the direction switching can be reduced. In this embodiment, as in the aforementioned embodiments, image brightness can be increased and cost can be reduced. In addition, sufficient gray scale levels can be displayed.

Although the third and fifth embodiments have been described as using a linear motor as the scanning means for moving continuously the color band sets over the DMD panel by the amount corresponding to an integral multiple of their pitch, this is not restrictive. For example, a motor and a cam may be used to reciprocate the lenticular lens system.

Further, although the aforementioned embodiments have been described as using a DMD panel or reflective liquid crystal panel as the light valve, this is not restrictive. Any light valve can be used provided that it has a response fast enough to make color-sequential display.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claim is:

1. A single-panel color projector comprising:

a white light source;

color separating/reflecting means for separating white light emitted from the white light source into a plurality of color light beams and reflecting each of the light beams at a different angle;

conversion means for converting the color light beams reflected by the color separating/reflecting means into color band sets arranged in a predetermined pitch, each color band consisting of a set of subbands of the color light beams arranged in a predetermined sequence;

focusing means for focusing the color band sets from the conversion means onto a light valve for light modulation;

scanning means for moving the color band sets from the conversion means over the light valve by the amount corresponding to the pitch of the color band sets; and projection means for projecting light modulated in the light valve.

2. The single-panel color projector according to claim 1, wherein the color separating/reflecting means comprises a first dichroic mirror for selectively reflecting light within red waveband, a second dichroic mirror for selectively reflecting light within green waveband, and a third dichroic mirror for selectively reflecting light within blue waveband, each of the first, second and third dichroic mirrors being placed at a different angle with respect to incident light.

3. The single-panel color projector according to claim 1, wherein the conversion means comprises a lenticular lens system which has large-pitch lenticular lenses and small-pitch lenticular lenses formed on opposed surfaces.

4. The single-panel color projector according to claim 3, wherein the lenticular lens system is arranged such that each set of three contiguous lenses of the small-pitch lenticular lenses is opposed to one of the large-pitch lenticular lenses and the focal length of the small-pitch lenticular lenses is set to be one-third or less of the focal length of the large-pitch lenticular lenses.

5. The single-panel color projector according to claim 1, wherein the light valve comprises a digital micromirror device.

6. The single-panel color projector according to claim 1, wherein the scanning means has an encoder and a mirror galvanometer mounted rotatably to an axis of rotation of the encoder and driven to repeatedly rotate in opposite directions.

7. The single-panel color projector according to claim 1, wherein the decomposing/reflecting means comprises a phase volume grating for decomposing incident light into red, green and blue light beams at some angle with one another and a lenticular lens system responsive to incident red, green and blue light beams for producing a plurality of color band sets each consisting of a set of red, green and blue subbands separated from one another.

8. A single-panel color projector comprising:

a white light source;

color separating/reflecting means for separating white light emitted from the white light source into a plurality of color light beams and reflecting each of the light beams at a different angle;

conversion means for converting the color light beams reflected by the color separating/reflecting means into color band sets arranged in a predetermined pitch, each color band consisting of a set of subbands of the color light beams arranged in a predetermined sequence;

focusing means for focusing the color band sets from the conversion means onto a light valve for light modulation;

scanning means for moving the color band sets from the conversion means over the light valve by the amount corresponding to a multiple of the pitch of the color band sets; and projection means for projecting light modulated in the light valve.

9. The single-panel color projector according to claim 8, wherein the color separating/reflecting means comprises a first dichroic mirror for selectively reflecting light within the red waveband, a second dichroic mirror for selectively reflecting light within the green waveband, and a third dichroic mirror for selectively reflecting light within the blue waveband, each of the first, second and third dichroic mirrors being placed at a different angle with respect to incident light.

10. The single-panel color projector according to claim 8, wherein the conversion means comprises a lenticular lens system which has large-pitch lenticular lenses and small-pitch lenticular lenses formed on opposed surfaces.

11. The single-panel color projector according to claim 10, wherein the lenticular lens system is arranged such that each set of three contiguous lenses of the small-pitch lenticular lenses is opposed to one of the large-pitch lenticular lenses and the focal length of the small-pitch lenticular lenses is set to be one-third or less of the focal length of the large-pitch lenticular lenses.

12. The single-panel color projector according to claim 8, wherein the light valve comprises a digital micromirror device.

13. The single-panel color projector according to claim 11, wherein the scanning means comprises driving means for reciprocating the lenticular lens system and an encoder.

14. The single-panel color projector according to claim 8, wherein the conversion means is in the shape of a cylinder formed with large-pitch lenticular lenses on its inner surface and small-pitch lenticular lenses on its outer surface.

15. The single-panel color projector according to claim 14, wherein each set of three contiguous lenses of the small-pitch lenticular lenses is opposed to one of the large-pitch lenticular lenses and the focal length of the small-pitch lenticular lenses is set to be one-third or less of the focal length of the large-pitch lenticular lenses.

16. The single-panel color projector according to claim 14, wherein the cylindrically-shaped scanning means includes driving means for rotating the conversion means in one direction.

17. The single-panel color projector according to claim 8, wherein the color separating/reflecting means comprises a phase volume grating for separating incident light into red, green and blue light beams at some angle with one another and a lenticular lens system responsive to incident red, green and blue light beams for producing a plurality of color band sets each consisting of a set of red, green and blue subbands separated from one another, the phase volume grating and the lenticular lens system being formed integral with each other and driven together by the scanning means in a reciprocating manner.

\* \* \* \* \*